Aug. 24, 1954     E. W. MERRILL     2,687,447
BATTERY SEPARATOR
Filed April 25, 1951

Inventor
EDWARD WILSON MERRILL
By Theodore C. Browne
Attorney

Patented Aug. 24, 1954

2,687,447

UNITED STATES PATENT OFFICE 2,687,447

BATTERY SEPARATOR

Edward Wilson Merrill, Cambridge, Mass., assignor to Dewey and Almy Chemical Company, North Cambridge, Mass., a corporation of Massachusetts Application April 25, 1951, Serial No. 222,920

1 Claim. (Cl. 136—146)

This invention relates to battery separators and is concerned with an improvement in separators formed from cellulose webs which have been impregnated with an acid resistant resin. One form of such a separator is disclosed in my copending application entitled "Improvement in Battery Separators," filed April 11, 1950, Serial No. 155,294.

In the application referred to above, I disclosed a battery separator formed essentially from a cellulose web, although glass fibers and small amounts of African blue asbestos might be added to increase its strength. The webs were impregnated with an acid resistant resin of the thermosetting type. The ribs of the separator were formed by passing the web between a pair of heated forming rolls designed in such a manner that only the ribs came in contact with the rolls and only the rib portion of the separator was cured in the passage of the web through the bite of the forming rolls. Subsequently the resin in the electrolyte permeable areas of the separator was cured by heating the web in an oven. The present invention produces separators having much lower electrical resistance than formerly was possible.

The thin, porous separators placed between the alternate positive and negative plates in the cells of storage plates are necessary primarily to prevent the electrical short circuiting of the cell either from the mechanical displacement of the plates due to road shocks, or from heat and chemical causes. A satisfactory separator must have sufficient mechanical strength initially to permit it to be assembled into the close-packed sandwich of plates and separators, and even after prolonged exposure to the acid electrolyte it still must be strong enough to prevent short circuits. Yet such separators while acting as electrical insulators between the plates must permit free electrolytic conduction so that the internal resistance of the battery is as low as possible. While many varieties of separators have been proposed in the past, very few have been able to meet the rigorous requirements, particularly the low resistance requirements which are necessary.

For a long time it has been known that, when cellulose fibers were soaked in a solution of caustic soda of between 5 and 18% concentration, a very marked swelling of the cellulose took place. It has also been known that when such swollen, mercerized cellulose was formed into a pulp lap as by running through a hand mold, a very lofty, low density, porous mass resulted but paper was not formed. In fact, the literature is full of flat statements, such as the following, which appears on page 601 of Cellulose and Cellulose Derivatives, a monograph edited by Emil Ott, published in 1943 by the Interscience Publishers, Inc. of New York:

"Pulp which has been swollen by strong caustic solutions in the refining process is no longer suitable for the manufacture of paper. Consequently pulp which has been refined by strong alkaline treatment at lower temperatures is only suitable for the manufacture of cellulose derivatives, and in many cases is not suited for this latter purpose until it has been given further stabilizing treatments."

I have discovered that a relatively minor change in the handling of pulp subsequent to its complete mercerization in cool to cold caustic solution produces a pulp in which the loftiness and porosity characteristic of mercerized cellulose is maintained to a high degree but which nonetheless has felting properties which result in a paper of reasonable web strength so that the formation of paper on a Fourdrinier machine is practical. Additionally, the paper has sufficient strength, as determined by a Mullen tester, to withstand the handling and manufacturing strains which are necessary in the making of battery separators. I have also discovered that the degree of porosity which is characteristic of the new paper is so great that, even when considerable quantities of acid resistant resins have been deposited on the fibers to form acid resistant resin coatings, the final product exhibits a hereto unobtainable low electrical resistance, never exceeding 0.001 ohm per square inch per mil thickness in the current carrying areas of the separator.

Separators made of cellulose fibers which have been protected by coatings of acid resistant resins have been proposed in the past but, despite a critical shortage of wood suitable for use as battery separators, have not made headway in the storage battery industry because their electrical resistance has been greater than that of the conventional wood separator. The great loftiness and porosity which are characteristic of my new sheet permit the imbibition of sufficient acid resistant resin so that when the separators are placed in service in the sulfuric acid battery electrolyte of approximately 40% concentration and in which the temperatures frequently rise to as much as 150° F., they will be useful for two years or more. The series resistance introduced into the electrical system by the new separators is at least as low as that introduced by wooden separators of the best grade and is more uniformly maintained.

Figures 1, 2:
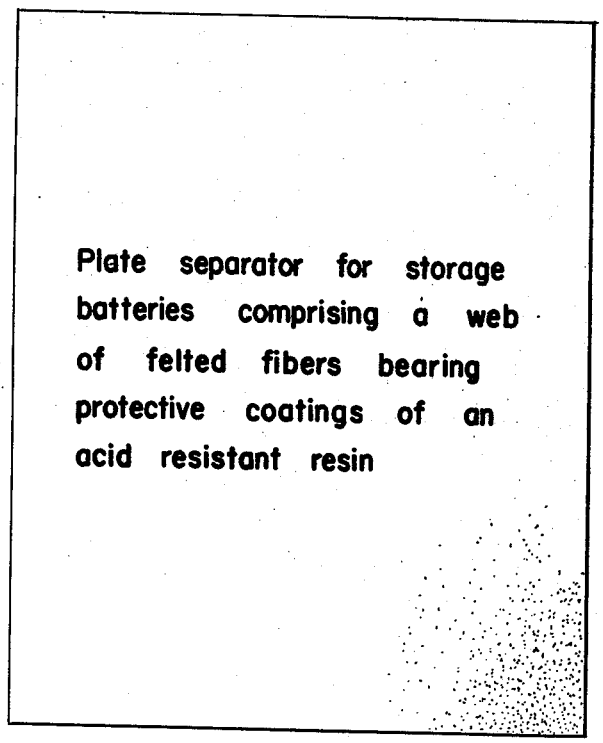
Figure 1 is a front view of a battery separator embodying the invention.
Figure 2 is a cross-section of the same separator.

The discovery which is the basis of this invention is that by hydrolyzing a completely mercerized cellulose pulp, felting properties are given to the pulp but the low density, loftiness, and highly porous qualities characteristic of deposited mercerized pulps is maintained to a high degree. Numerous methods of hydrolyzing causticized pulps are known. But I prefer to wash the causticized pulp until the wash water runs neutral and then treat the washed, causticized pulp in a mild mineral acid of from .05 to 0.15 normal concentration at 212° F. for one hour.

As a specific example, a strong, unbleached kraft pulp is soaked in a 15% solution of sodium hydroxide at a temperature not exceeding 68° F. for a time sufficient to secure "complete" mercerization. Mercerization takes place very quickly, but for mill practice one hour of soaking insures a uniformly mercerized batch. Sufficient caustic solution should be used to drown the pulp and make easy stirring possible. At the end of one hour's soaking, the caustic solution is drained from the pulp, and the pulp is washed in water until neutrality is reached. It is convenient to touch the pulp with pH paper.

The neutral, mercerized pulp may be tested for its degree of mercerization in the following manner:

1½ grams dry weight of pulp are suspended in 1000 cubic centimeters of water, and the suspension is run through a Williams freeness tester. The freeness is noted. Ten grams of the dry pulp are suspended in 600 cubic centimeters of water, and the suspension is poured into a Waring Blendor, which is run for ten minutes. Thereafter, the suspension in the blender is diluted with water to one litre volume and a 150 cc. sample of the suspension is further diluted to 1 litre volume to give a suspension of 1½ grams of pulp in one litre of slurry. This is run through a Williams freeness tester. It is considered that substantially complete mercerization is secured if the freeness as measured in the Williams tester on the sample run for ten minutes in the Waring Blendor does not advance more than one second over the freeness figure derived from the original sample.

After the pulp has been washed, neutralized and drained, it is hydrolyzed in a dilute mineral acid. Eight parts by weight of pulp are suspended in 100 parts by weight of a 0.05 normal to 0.15 normal sulfuric acid solution, and the slurry is boiled for one hour. After the acid boil, the pulp is washed until it is neutral as determined by a pH test paper, and then the pulp is dumped into a paper beater. Only a light roll setting is used, and the beating is continued until a sample of the slurry shows a freeness of about 8 seconds Williams. About 5%, based on the dry weight of the pulp, of a wet strength resin such as urea-formaldehyde (Parez 609) is added to the slurry at the end of the beating period. From the beater, the slurry is run to the headbox of the paper machine. It should be understood that different Fourdrinier machines may require a different degree of beating to produce a paper having the desired characteristics and that the freeness figure resulting from the beating operation will vary. However, when a slurry treated as above and beaten to a Williams freeness of 8 seconds is used, the machine on which my papers are manufactured produces papers having a density or compactness of 3.8 to 4.5 measured as the ratio of the weight of 500 sheets measuring 24" x 36" to the thickness of a single sheet in thousandths of an inch, with a porosity lying between 5 and 9 seconds as measured on the Gurley densometer. The press roll of the paper machine is not used.

The Gurley test is run according to TAPPI Specification #T460m49 with the following changes:

Weight of the cylinder 5 ounces.
Volume of air_____ 400 cubic centimeters.
Thickness of the sheet
  tested _____ .025 to .032 of an inch.

The Mullen strength of the paper is from 20 to 25 lbs. per square inch for papers approximately .014 inch thick.

The Mullen test is run in accord with TAPPI Specification #T403m47.

Such a combination of low density, high porosity and strength has not hitherto been achieved. It makes possible the formation of battery separators by the following procedure:

After the slurry is run out on the wire and the paper process is complete, the felt is slit into widths equal to the vertical height of the separators. The slit roll is then floated across a bath containing a thermosetting resin. Many suitable resins are available. The essential characteristics are that the resin shall resist battery acid, coat the fibers well, and re-act to a relatively inert, infusible stage in the presence of heat. Examples are the furfural-aldehyde resins, urea-aldehyde resins and the phenolic group.

Floating the web permits the resin solution to be imbibed from the lower surface. As the solution rises by capillarity through the web, air is expelled through the open upper surface. This procedure insures almost instantaneous saturation. If, on the other hand, the web is led beneath the solution, air is trapped in the interstices of the web and the penetration of the resin is delayed for a very long time. Preferably, the resin is advanced at this time only to a stage at which the resin is soluble in a simple solvent such as water, alcohol, or acetone. For example, if a phenolic resin in water solution is used for the impregnant, it may contain from 10 to 35% of resin solids, depending upon the particular resin and the density and porosity of the web.

The saturated web is then run through a calender which preferably is adjusted to exert a limited thrust per linear inch so that the desired proportion of resin, from 10 to 35% of dry resin to the dry weight of the web, remains after the web is dried and cured. After the excess resin has been removed by this calendering operation, it is advantageous to dry the web quite slowly in air that is heated to not over 150° F. Rapid drying causes the resin to concentrate adjacent the surface and leave the central portion of the sheet. The surface concentration may leave such a small proportion of resin in the center of the web that later the organic fibers may be attacked by battery acid. After the web is dried, it is run through a rib-forming apparatus of any desired design. The web then passes through a curing oven maintained at about 375 to 395° F. at a speed which will insure the complete reaction of the resin in the web to its infusible or C stage.

As the web leaves the oven, it is floated over the surface of a ½% to 4% (a 2% solution is preferred) water solution of a sulfonated wetting agent such as Turkey red oil. Floating the web allows it to imbibe the wetting-out solution from its underside while out-gassing itself through the upper surface with the same advantage of great speed and uniformity in imbibition which has been described in connection with the resin impregnation.

This step of wetting-out the web is very desirable in the production of a satisfactory separator. The resins are hydrophobic and, unless the separator is wetted out, it is permeable to battery acid only after a long time has elapsed.

After the low temperature drying just described, the treated web is cut into appropriate lengths to form battery separators.

I prefer to impregnate the paper so that the dry resin content is approximately 25% based on the dry weight of the paper. At least 10% of resin should be used to protect adequately the paper from degradation in acid, but no more than 35% of resin should be used, for above this limit the electrical resistance of the separators increases sharply.

The paper stock may contain fine glass fibers alone, or acid washed African blue asbestos, or a combination of the two. I have used as much as 38% of glass and as much as 20% of asbestos with satisfactory results. Provided the paper stock has the characteristics given above, the addition of glass or asbestos plays very little role in the performance of the finished separator except to increase its strength and its acid resistance. When such materials are used, the paper stock will be adequately protected from acid attack if the weight of the resin deposited on the fiber is 10% of that of the unimpregnated dry paper. If cellulose alone is used, a higher proportion of resin is desirable, and 25% is recommended. The impregnation of the paper decreases the flexibility to a marked degree and makes the finished separator fragile. To measure the fragility, I measure the bend strength at break of the separator in the following manner:

A strip of the finished separator is firmly clamped and subjected to sidewise deflection until the strip breaks. To be sufficiently resistant to breakage during the assembly of the battery, a separator having a web thickness of 0.030 inch should have a breaking moment in excess of 0.100 inch lb. per linear inch. My separators easily exceed this strength figure. After prolonged exposure to hot sulfuric acid of approximately 40% strength, such a separator will have a breaking strength of about 45% of its original value.

The investigation of the permissible ranges of density and strength in the low density papers made according to this invention shows that, if the density of the paper exceeds approximately 4.5 under the conditions given, the electrical resistance of a separator made from such a paper will exceed the desired maximum of 0.00100 ohm per square inch per mil thickness. The opposite limit of density occurs at a density of about 3.8 measured in the same manner. Below this density the paper becomes unsatisfactory for use in battery separators due to its poor sheet formation, low strength and the presence of pinholes.

Within this range of densities the electrical resistance of the finished separator depends primarily upon the porosity of the paper as indicated by the Gurley densometer readings. If the densometer reading exceeds 9 or 10 seconds, the electrical resistance of a separator having a resin content of approximately 25% will exceed the desired maximum even at the lower density. I have employed papers having densometer readings as low as 5 seconds with satisfactory results, but have been unable to obtain papers having a greater degree of air porosity which also have the other necessary characteristics.

I have found that if the strength of the paper as measured by a Mullen paper tester is less than about 0.80 lb. per square inch per mil thickness of paper, the separators formed from such sheets are to fragile to withstand the normal abuse in the factory assembly of storage batteries. There is no upper limit of strength, provided that the density of the paper does not exceed the values given.

Although the paper has been developed in conjunction with my development of a satisfactory low-resistance storage battery separator, it is evident that such a low density, high strength paper possesses other uses than in battery separators and is particularly suitable for use in air and liquid filters. Furthermore, the highly permeable resin-impregnated sheets also have usefulness in fields other than battery separators, as for instance dust-excluding diaphragms. The paper and such impregnated diaphragms are within the scope of my invention.

In the following claims the numerical values for density, porosity and strength are given. It is understood that they refer to the values determined by tests made as described in this specification.

This application is a continuation-in-part of my application for patent Serial Number 155,294, filed April 11, 1950.

I claim:

A storage battery plate separator comprising a web of felted fibers bearing protective coatings of an acid resistant resin, the fibrous web having a density of 3.8 to 4.5, a porosity lying between 5 and 9 seconds, a dry strength in excess of 0.8 lb. per square inch per mil thickness of the web, the completed separator having a resin content lying between 10 and 35% of the weight of the fiber, said separator having a breaking moment in excess of 0.100 inch lb. per linear inch per 0.030 inch of separator thickness, and having an electrical resistance in the current carrying areas of not over 0.001 ohm per square inch per mil thickness.

References Cited in the file of this patent

UNITED STATES PATENTS

| Number | Name | Date |
| --- | --- | --- |
| 1,744,256 | Benner | Jan. 21, 1930 |
| 1,989,098 | Lillienfeld | Jan. 29, 1935 |
| 2,033,485 | Schur | Mar. 10, 1936 |
| 2,084,272 | Auchterlonie | June 15, 1937 |
| 2,105,711 | Wethered | Jan. 18, 1938 |
| 2,175,154 | Merrill | Oct. 3, 1939 |
| 2,382,621 | Fairclough | Aug. 14, 1945 |
| 2,520,963 | Reeves | Sept. 5, 1950 |
| 2,543,137 | Uber | Feb. 27, 1951 |
| 2,566,960 | Philipps | Sept. 4, 1951 |
| 2,591,754 | Wilson et al. | Apr. 8, 1952 |
| 2,645,577 | Bate et al. | July 14, 1953 |

OTHER REFERENCES

Rev. Gen. Mat. Col., February 1, 1902, p. 31.

Jayme: Paper Trade J., May 26, 1938, pp. 39 and 41.

RYS et al.: Paper Trade J., May 11, 1939, pp. 36–39.

Boehm: Paper Trade J., May 2, 1940, pp. 35–38.

Paper Ind. and Paper World, October 1941, p. 734.

Cellulose and Cellulose Derivatives, by Ott, published by Interscience Publishers, Inc., New York, 1943, pp. 274–280, 601–603.

Dictionary of Paper, 2nd ed., pp. 49 and 138, published by American Paper and Pulp Association, New York, 1951.